(12) United States Patent
Park

(10) Patent No.: US 9,471,950 B2
(45) Date of Patent: Oct. 18, 2016

(54) DEVICE AND METHOD OF INSERTING WATERMARKS THROUGH CONVERSING CONTENTS AUTOMATICALLY

(71) Applicant: SIGONGMEDIA CO., LTD, Seongnam-si, Gyeonggi-do (KR)

(72) Inventor: Ki Seok Park, Seoul (KR)

(73) Assignee: SIGONGMEDIA CO., LTD., Seongnam-si (KR)

(*) Notice: Subject to any disclaimer, the term of this patent is extended or adjusted under 35 U.S.C. 154(b) by 674 days.

(21) Appl. No.: 13/684,280

(22) Filed: Nov. 23, 2012

(65) Prior Publication Data

US 2014/0133693 A1    May 15, 2014

(30) Foreign Application Priority Data

Nov. 9, 2012    (KR) .................. 10-2012-0126869

(51) Int. Cl.
| | | |
|---|---|---|
| G06K 9/00 | (2006.01) | |
| G06T 1/00 | (2006.01) | |
| H04N 21/2343 | (2011.01) | |
| H04N 21/2389 | (2011.01) | |
| H04N 21/2743 | (2011.01) | |
| H04N 21/8358 | (2011.01) | |
| G06F 21/10 | (2013.01) | |

(52) U.S. Cl.
CPC .............. *G06T 1/0021* (2013.01); *G06F 21/10* (2013.01); *H04N 21/2343* (2013.01); *H04N 21/23892* (2013.01); *H04N 21/234336* (2013.01); *H04N 21/2743* (2013.01); *H04N 21/8358* (2013.01); *G06F 2221/2101* (2013.01)

(58) Field of Classification Search
CPC . G06T 1/0021; G06T 1/0028; G06T 1/0035; G06T 1/0042; G06T 1/005; G06T 1/0057; G06T 1/0064; G06T 1/0071; G06T 1/0085; G06T 1/0092; G06T 2201/005; G06T 2201/0051; G06T 2201/0052; H04N 1/32144; H04N 1/3232; H04N 1/32331
See application file for complete search history.

(56) References Cited

U.S. PATENT DOCUMENTS

| | | | |
|---|---|---|---|
| 6,411,725 B1* | 6/2002 | Rhoads | G06F 17/30876 |
| | | | 375/E7.089 |
| 7,334,247 B1* | 2/2008 | Finseth | G06T 1/0021 |
| | | | 725/21 |
| 2002/0018233 A1* | 2/2002 | Mori | H04N 1/00238 |
| | | | 358/1.15 |

(Continued)

FOREIGN PATENT DOCUMENTS

| | | | |
|---|---|---|---|
| JP | 2000-175161 A | 6/2000 | |
| JP | 2002-027223 A | 1/2002 | |

(Continued)

OTHER PUBLICATIONS

Hartung et al ("Watermarking of uncompressed and compressed video", 1998).*

*Primary Examiner* — Avinash Yentrapati
(74) *Attorney, Agent, or Firm* — Sughrue Mion, PLLC

(57) ABSTRACT

Provided are a watermark insertion apparatus and method. The watermark insertion method includes acquiring content through upload by a user, storing the uploaded content, receiving a content conversion request from a user or a manager, determining whether content for which content conversion has been requested is video or an image, converting the content according to the determined content kind, and inserting watermark suitable for the content kind into the converted content.

13 Claims, 1 Drawing Sheet

(56) References Cited

U.S. PATENT DOCUMENTS

| | | | |
|---|---|---|---|
| 2002/0073214 A1* | 6/2002 | Iinuma | G06F 21/10 709/229 |
| 2002/0120849 A1* | 8/2002 | McKinley | G06F 17/30817 713/176 |
| 2002/0186881 A1* | 12/2002 | Li | H04N 1/3871 382/164 |
| 2003/0097568 A1* | 5/2003 | Choi | G06T 1/0042 713/176 |
| 2004/0021549 A1* | 2/2004 | Choi | G06F 21/10 340/5.8 |
| 2004/0032967 A1* | 2/2004 | Kim | G06T 1/0057 382/100 |
| 2005/0018843 A1* | 1/2005 | Park | G06F 21/10 380/203 |
| 2005/0074139 A1* | 4/2005 | Seo | G06T 1/0057 382/100 |
| 2005/0185214 A1* | 8/2005 | Suwabe | H04N 1/00209 358/1.15 |
| 2005/0190948 A1* | 9/2005 | Isogai | G06T 1/0028 382/100 |
| 2005/0276519 A1* | 12/2005 | Kitora | G06Q 10/10 382/305 |
| 2005/0286088 A1* | 12/2005 | Takagi | H04N 1/32229 358/3.28 |
| 2007/0053438 A1* | 3/2007 | Boyce | G06T 1/0042 375/240.24 |
| 2007/0091376 A1* | 4/2007 | Calhoon | G06T 1/0021 358/3.28 |
| 2008/0025554 A1* | 1/2008 | Landwehr | H04N 1/32144 382/100 |
| 2009/0147985 A1* | 6/2009 | Chen | G06F 21/16 382/100 |
| 2009/0150676 A1* | 6/2009 | Chen | G06T 1/0021 713/176 |
| 2010/0177891 A1* | 7/2010 | Keidar | H04N 5/913 380/200 |
| 2011/0194154 A1* | 8/2011 | Oi | H04N 1/00005 358/448 |
| 2011/0261959 A1* | 10/2011 | Joseph | G06F 21/16 380/255 |
| 2012/0287308 A1* | 11/2012 | Kojima | H04N 5/772 348/239 |

FOREIGN PATENT DOCUMENTS

| | | |
|---|---|---|
| JP | 2002-149848 A | 5/2002 |
| JP | 2003-076873 A | 3/2003 |
| JP | 2003-099319 A | 4/2003 |
| JP | 2004-080095 A | 3/2004 |
| JP | 2010-074330 A | 4/2010 |
| JP | 2011-164914 A | 8/2011 |
| KR | 10-2004-0001213 A | 1/2004 |
| KR | 10-2004-0034567 A | 4/2004 |

* cited by examiner

DEVICE AND METHOD OF INSERTING WATERMARKS THROUGH CONVERSING CONTENTS AUTOMATICALLY

CROSS-REFERENCE TO RELATED APPLICATIONS

This application claims priority under 35 U.S.C. §119 to Korean Patent Application No. 10-2012-0126869, filed on Nov. 9, 2012, the disclosure of which is incorporated herein by reference in its entirety.

TECHNICAL FIELD

The present disclosure relates to an apparatus and method for inserting watermark, and in particular, to an apparatus and method for inserting watermark through automatic content conversion.

BACKGROUND

As information communication technology advances, various data formats are changed from an analog format to a digital format in which processing is easy, and quality is not degraded even after several-time reproduction and copy. With the advancement of the Internet, digital data is widely distributed.

In such digital data, digital video is widely used on the Internet due to the advancement of compression technology such as joint photographic coding experts group (JPEG).

The digital video is easy to copy and distribute, and thus, when the digital video is indiscriminately distributed without an author's consent in an open space such as the Internet, it is unable to protect the intellectual property rights of an author and a copyright owner.

To overcome such limitations, a watermarking technique that determines the falsification and unlawful use of digital video and enables the claim of copyright is proposed as a technique that adds an imperceptible signal into digital video and uses the imperceptible signal for authentication and protection of copyright.

Various watermarking techniques have been developed at present, but a technique using a pseudo random sequence is mainly used at present. Also, instead of a spatial domain, a transformed domain using a discrete Fourier transform or a discrete cosine transform is mainly used for a domain into which watermark is inserted.

However, the related art method inserts watermark without systematically sorting the kinds of contents in an operation that stores contents and performs content conversion, and thus, a user needs to again sort contents by kind. For this reason, much time is unnecessarily expended, and work efficiency is low, causing inconvenience in use.

SUMMARY

Accordingly, the present disclosure provides a watermark insertion apparatus and method that determine the kind of content uploaded by a user, performs automatic content conversion on the determined content, and inserts watermark into the content.

In one general aspect, a watermark insertion apparatus includes: a controller acquiring a content upload request of a user and a content conversion request of a manager; a content storage storing uploaded content and/or content for which content conversion has been performed; and a content converter performing content conversion on the uploaded content according to a control by the controller, inserting watermark into the content, and storing the content in the content storage.

In another general aspect, a watermark insertion method includes: acquiring content through upload by a user; storing the uploaded content; receiving a content conversion request from a user or a manager; determining whether content for which content conversion has been requested is video or an image; converting the content according to the determined content kind; and inserting watermark suitable for the content kind into the converted content.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

Figure 1:
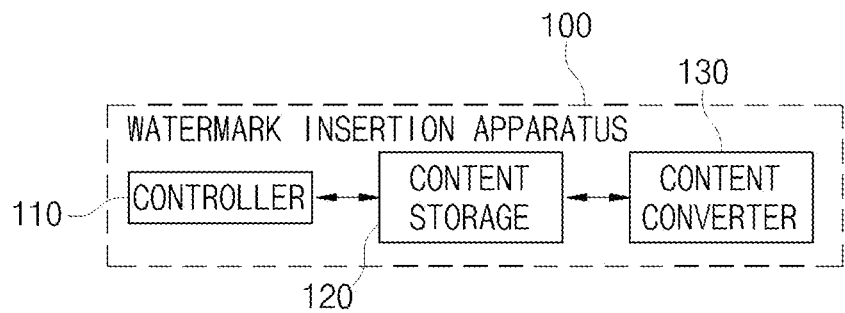
FIG. 1 is a block diagram illustrating a watermark insertion apparatus according to an embodiment of the present invention.

FIG. 1 is a block diagram illustrating a watermark insertion apparatus according to an embodiment of the present invention.

Referring to FIG. 1, a watermark insertion apparatus 100 includes a controller 110, a content storage 120, and a content converter 130.

The controller 110 acquires a content upload request of a user and a content conversion request of a manager. Specifically, the controller 110 acquires a user content request by performing wired or wireless communication with at least one of a personal computer (PC), a notebook computer, a netbook computer, a smart phone, and a tablet PC.

For example, a user accesses the watermark insertion apparatus 100 through Wi-Fi by using Galaxy Tap 10.1 inches tablet PC manufactured by Samsung company, and, when the user requests movie video or a high-resolution image, the controller 110 acquires a user content request.

The content storage 120 stores uploaded contents and/or converted contents. The content storage 120 stores uploaded contents or contents for which conversion and watermark insertion have been completed.

In detail, the content storage 120 stores uploaded movie video or images, and movie video or images in which content conversion has been performed and watermark is inserted thereinto.

The content converter 130 performs content conversion on uploaded content according to a control by the controller 110, inserts watermark into the content, and stores the content in the content storage 120.

Moreover, the content storage 130 requests content from the content storage 120, and performs content conversion in a first-in first-out (FIFO) scheme. The FIFO scheme is a scheme on a FIFO data structure, and denotes a scheme in which first-input data is first outputted. For example, when movie videos are stored as movie 1, movie 2, and movie 3 in the content storage 130, content conversion is performed in the order of movie 1, movie 2, and movie 3.

The content converter 130 determines the kind of content acquired from the content storage 120, and inserts watermark suitable for the content.

Specifically, when an extension of a content kind for which conversion has been requested is avi, mpeg, mp4, wmv, asf, asx, fly, swf, mkw, skm, k3g, ogv, ts, or tp, the content converter 130 determines the content as video. When an extension of a content kind is jpg, gif, tif, bmp, png, pct, or pcx, the content converter 130 determines the content as an image.

When acquired content is an image, the content converter 130 diagonally inserts watermark into the content. When acquired content is video, the content converter 130 inserts tetragonal watermark into an image frame center.

When acquired content is video, the content converter 130 performs encoding on the content, and, when acquired content is an image, the content converter 130 extracts a thumbnail from the content. For example, a 2.57-gigabyte avi file is converted into a 347-megabyte mp4 file by encoding movie video, and a 2-megabyte jpg file is converted into a 10-kilobyte bmp file by extracting a thumbnail from a high-resolution image.

Moreover, when acquired content is video, the content converter 130 performs encoding on the content, and then inserts watermark into the content. When acquired content is an image, the content converter 130 extracts thumbnails by designated size (for example, 50 KB, 25 KB, and 10 KB) from the content, and inserts watermark into the content.

In detail, when acquired content is movie video, the content converter 130 performs encoding on the content and simultaneously inserts watermark (contents way) into the content. When acquired content is an image, the content converter 130 performs a thumbnail from the content and simultaneously inserts watermark (contents way) into the content.

In another embodiment, the content converter 130 may change a size, position, and concentration of watermark.

For example, a watermark size change input window may be displayed for changing a watermark size in a content video screen or a content image, and a user's explicit intention may be inputted through the watermark size change input window, whereby a watermark size may be changed to 100%, 50%, 33% or the like of a video screen size or an image size.

In changing a watermark position, a position change input window is displayed, and a user's explicit intention may be inputted through the position change input window, whereby a watermark position may be selected from among an upper portion, lower portion, left portion, right portion, and center portion of a screen a user views. Also, a user may freely change a watermark position by moving watermark to insert upward and downward, left and right, left diagonally, right diagonally, or circularly in a drag and drop scheme.

Moreover, a watermark concentration may be changed. A watermark concentration change input window may be displayed, and adjusted to 0% to 100% by a progressive bar scheme.

Figure 2:
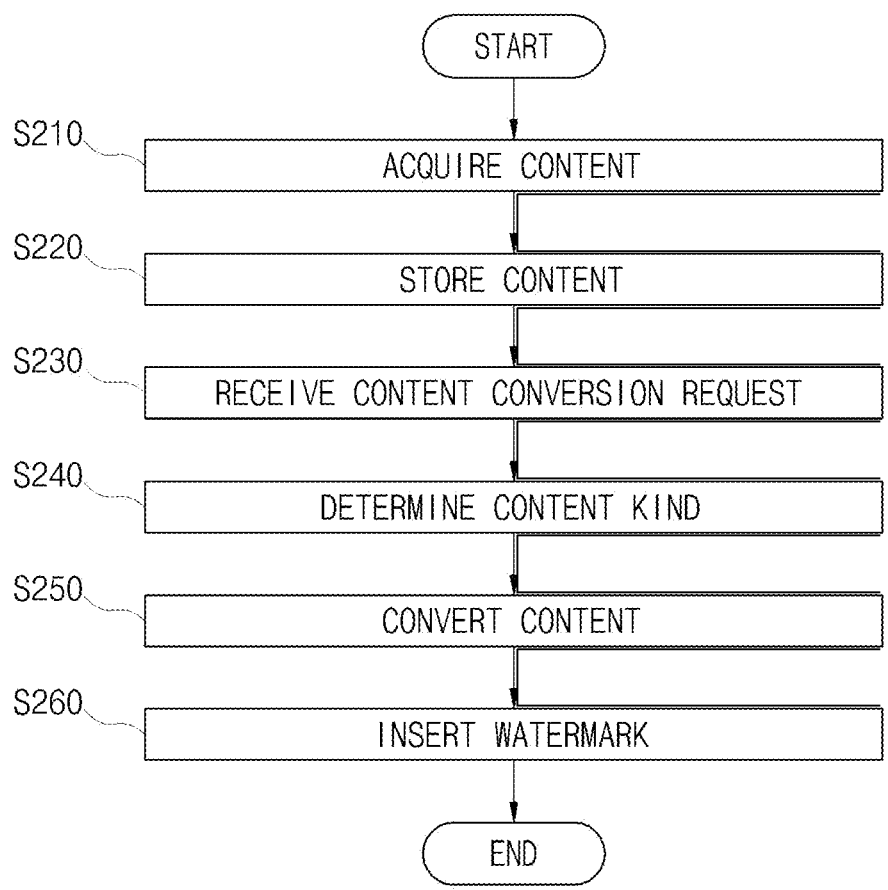
FIG. 2 is a flowchart illustrating a watermark insertion method according to an embodiment of the present invention.

FIG. 2 is a flowchart illustrating a watermark insertion method according to an embodiment of the present invention.

Referring to FIG. 2, content is first acquired through upload by a user in operation S210.

In detail, a user may acquire content by uploading a video file such as movie or drama and an image file such as a picture or a photograph using the controller 110.

Subsequently, the watermark insertion apparatus stores the uploaded content in operation S220. Specifically, the content storage 120 stores an uploaded video file and an uploaded image file.

Subsequently, the watermark inserting apparatus receives a content conversion request from the user or a manager in operation S230. In detail, the controller 110 receives the content conversion request from the user or the manager.

Then, the watermark insertion apparatus determines whether content for which conversion has been requested is video or an image in operation S240. Specifically, when an extension of a content kind for which conversion has been requested is avi, mpeg, mp4, wmv, asf, asx, fly, swf, mkw, skm, k3g, ogv, ts, or tp, the watermark insertion apparatus determines the content as video. When an extension of a content kind is jpg, gif, tif, bmp, png, pct, or pcx, the watermark insertion apparatus determines the content as an image. For example, when a file for which conversion has been requested is movie video, an extension of the file is avi, and thus, the watermark insertion apparatus determines the file as video. Also, an extension of a high-resolution image file is jpg, and thus, the watermark insertion apparatus determines the high-resolution image file as an image.

Subsequently, the watermark insertion apparatus performs content conversion according to the kind of content in operation S250. In detail, when content is video, the watermark insertion apparatus performs encoding on the content, and, when content is an image, the watermark insertion apparatus extracts thumbnails by designated size from the content to perform content conversion.

Moreover, the watermark insertion apparatus converts a result material, for which content conversion has been performed, into a reproducible format irrespective of the kind of a reproducer.

For example, when content is a flash file "flv or swf", a flash program is necessary for reproduction, and, when an extension of a file is ts or tp, the file is reproduced by only a video reproducer with a dedicated player installed therein. However, when a result material is changed to at least one of mp4, avi, and mpg files by performing encoding, the result material is reproduced irrespective of the kind of a video reproducer.

A signal transmitted from a broadcasting station to a high definition television (HD TV) is TS, in association with a tp or ts file. A scheme of storing TS in a computer is tp or ts. To provide a simple description, the tp or ts file denotes a file in which the HD TV original is stored as-is. When a file capacity is as large as a one-hour duration, the file capacity is 10 GB or more, and thus, it is required to adjust the file to an appropriate size.

Therefore, when converted content is disclosed as a sample on a homepage, an accessed user may reproduce the content for sample independent of the type of a terminal accessing the homepage or a reproduction program installed in the terminal.

Finally, the watermark insertion apparatus inserts watermark suitable for a content kind into content in operation S260.

Specifically, the watermark insertion apparatus changes a watermark size according to a content video screen size or a content image size and inserts watermark into content, or, the watermark insertion apparatus changes a watermark position according to a video screen or an image and inserts watermark into content. As described above, the content converter 130 may adjust a size, position, and concentration of watermark and insert watermark suitable for the need of a user.

Moreover, since the watermark insertion apparatus first performs content conversion and then inserts watermark, a watermark size is not changed according to a file size. For example, in inserting watermark (624 pixels×300 pixels) having a constant size into a video frame, the size of watermark for 1.37-gigabyte video (720×300) is relatively small, and the size of watermark for 350-megabyte video (624×352) is relatively large. However, when content conversion is performed and then watermark is inserted, even though a file size is changed by content conversion, watermark (720×300) may be inserted into 1.37-gigabyte video (720×300), and watermark (624×352) may be inserted into 350-megabyte video (624×352). Therefore, even when a file size is changed by content conversion, a constant water size can be maintained, and a water size may be determined according to a user's intention.

According to another embodiment of the present invention, a method in which a purchaser identifier (ID) is inserted into provided content may be considered. Specifically, a watermark is added into content before purchasing the content, and, after the content is purchased, the watermark is extinguished. In this case, content purchased by a purchaser may be uploaded onto a file-sharing site, and unlawfully distributed.

Therefore, to prevent content purchased by a purchaser from being unlawfully distributed, a purchaser ID may be inserted into the content when the purchaser purchases the content.

In detail, a purchaser ID is inserted into corresponding content when purchase is determined. For example, when content is movie content of a two-hour duration, a purchaser ID is inserted into respective frames corresponding to a 30-minute point, a 60-minute point, or a 90-minute point among a plurality of video file frames.

Subsequently, when a purchaser purchasing movie video uploads a movie video file onto the file-sharing site and thus the movie video is unlawfully distributed, by tracing respective user IDs inserted into corresponding video at a 30-minute point, a 60-minute point, or a 90-minute point, the present invention secures the identity of an unlawful distribution user, thereby preventing the unauthorized copy of content.

As described above, in consideration of the kinds of contents, when content is video, the present invention performs encoding on the content, and, when content is an image, the present invention extracts thumbnails by designated size from the content, and performs encoding and thumbnail processing on the content, whereupon the present invention inserts watermark into the content. Therefore, unlike the related art watermarking method that separately inserts watermark without systematically sorting the kinds of contents, the present invention systematically sorts the kinds of contents, perform content conversion, and simultaneously inserts respective watermarks into contents, thus enabling a user to conveniently acquire systematically-sorted contents with watermarks inserted thereinto. Accordingly, the present invention can overcome limitations of the related art watermarking method in which, by separately performing insertion of watermark and sorting of contents, much time is unnecessarily expended, and unnecessary operations are required.

Moreover, the present invention enables a user to select and change a size and position of watermark according to a video size and an image size, and thus, the user can conveniently select and adjust the size and position of watermark according to the user's preference.

Moreover, the present invention performs content conversion and inserts watermark into content, and thus, since a watermark size is not changed according to a converted file size, a constant watermark size is maintained even when a file size is changed by content conversion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A watermark insertion apparatus, comprising:
a processor;
a controller acquiring a content upload request and a content conversion request;
a content storage storing uploaded content and/or content for which content conversion has been performed; and
a content converter executed by the processor and configured to perform content conversion on the uploaded content according to a control by the controller, insert watermark into the content, and store the content in the content storage,
wherein the content converter determines a kind of the uploaded content acquired from the content storage, and inserts watermark suitable for the determined content kind into the acquired content,
wherein when the content converter determines that the acquired content is video, the content converter encodes the video, and inserts watermark suitable for the video into the encoded video,
wherein when the content converter determines that the acquired content is an image, the content converter extracts a thumbnail of a designated size from the image and inserts watermark suitable for the image into the extracted thumbnail, and
wherein when the acquired content is a video content having a first format which requires a program for reproduction of the video content or is reproduced by only a video reproducer with a dedicated player, the watermark insertion apparatus converts the video content for which the content conversion has been performed into a video content having a second format being one of MP4, AVI and MPG.

2. The watermark insertion apparatus of claim 1, wherein the controller acquires a user content request by performing wired or wireless communication with at least one of a personal computer (PC), a notebook computer, a netbook computer, a smart phone, and a tablet PC.

3. The watermark insertion apparatus of claim 1, wherein the content storage stores the uploaded content, or stores content for which content conversion and watermark insertion have been completed.

4. The watermark insertion apparatus of claim 1, wherein the content converter requests content from the content storage, and performs content conversion in a FIFO scheme.

5. A watermark insertion method, comprising:
acquiring content through upload by a user;
storing the uploaded content;
receiving a content conversion request;
determining whether content for which content conversion has been requested is video or an image;

converting the content according to the determined content kind; and inserting watermark suitable for the content kind into the converted content, wherein when it is determined that the content is the video, the video is encoded, and watermark suitable for the video is inserted into the encoded video, and when it is determined that the content is the image, a thumbnail of a designated size is extracted from the image and watermark suitable for the image is inserted into the extracted thumbnail, and wherein when the content is a video content having a first format which requires a program for reproduction of the video content or is reproduced by only a video reproducer with a dedicated player, the video content for which the conversion has been performed is converted into a video content having a second format being one of MP4, AVI and MPG.

6. The watermark insertion method of claim 5, wherein the inserting of watermark comprises changing a watermark size of the watermark according to a content video screen size or a content image size.

7. The watermark insertion method of claim 5, the inserting of watermark comprises changing a watermark position of the watermark, and inserting the watermark into the content.

8. The watermark insertion apparatus of claim 1, wherein the content converter changes a size of the watermark in response to an instruction inputted through a watermark size change input window.

9. The watermark insertion apparatus of claim 1, wherein the content converter changes a position of the watermark in response to an instruction inputted through a watermark position change input window.

10. The watermark insertion apparatus of claim 1, wherein the content converter changes a concentration of the watermark in response to an instruction inputted through a watermark concentration change input window.

11. The watermark insertion method of claim 5, the inserting of watermark comprises displaying a watermark concentration change input window and changing a watermark concentration of the watermark in response to an instruction inputted through the displayed watermark concentration change input window.

12. The watermark insertion method of claim 6, wherein the changing the watermark size comprises displaying a watermark size change input window and changing the watermark size in response to an instruction inputted through the displayed watermark size change input window.

13. The watermark insertion method of claim 7, wherein the changing the watermark position comprises displaying a watermark position change input window and changing the watermark position in response to an instruction inputted through the displayed watermark position change input window.

* * * * *